United States Patent
Schmidt et al.

(10) Patent No.: US 11,584,689 B2
(45) Date of Patent: Feb. 21, 2023

(54) TWO-COMPONENT SYSTEM FOR FORMATION OF COHESIVE BONDS OR FOR CHEMICAL ANCHORING

(71) Applicant: BASF SE, Ludwigshafen am Rhein (DE)

(72) Inventors: Marco Schmidt, Ludwigshafen am Rhein (DE); Alexander Centner, Ludwigshafen am Rhein (DE); Klaus Seip, Ludwigshafen am Rhein (DE); Daniel Sauter, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 53 days.

(21) Appl. No.: 17/256,035

(22) PCT Filed: Jun. 19, 2019

(86) PCT No.: PCT/EP2019/066140
§ 371 (c)(1),
(2) Date: Dec. 24, 2020

(87) PCT Pub. No.: WO2020/002070
PCT Pub. Date: Jan. 2, 2020

(65) Prior Publication Data
US 2021/0363062 A1 Nov. 25, 2021

(30) Foreign Application Priority Data

Jun. 25, 2018 (EP) ..................... 18179576

(51) Int. Cl.
*C04B 28/06* (2006.01)
*C04B 22/14* (2006.01)
*C04B 28/00* (2006.01)
*C04B 40/06* (2006.01)
*C04B 103/00* (2006.01)
*C04B 103/14* (2006.01)
*C04B 103/22* (2006.01)
*C04B 111/00* (2006.01)

(52) U.S. Cl.
CPC .......... *C04B 28/065* (2013.01); *C04B 22/147* (2013.01); *C04B 28/003* (2013.01); *C04B 40/0608* (2013.01); *C04B 2103/0094* (2013.01); *C04B 2103/14* (2013.01); *C04B 2103/22* (2013.01); *C04B 2111/00637* (2013.01)

(58) Field of Classification Search
CPC ... C04B 14/06; C04B 22/0013; C04B 22/062; C04B 22/142; C04B 22/147; C04B 22/165; C04B 24/04; C04B 24/2664; C04B 28/003; C04B 28/06; C04B 28/065; C04B 40/0039; C04B 40/0608; C04B 40/065; C04B 2103/0094; C04B 2103/12; C04B 2103/14; C04B 2103/22; C04B 2111/00637; C04B 2111/00663; C04B 2111/00715; C04B 2111/72
See application file for complete search history.

(56) References Cited

U.S. PATENT DOCUMENTS

| 4,269,749 A | 5/1981 | Marriott et al. |
| 2014/0343194 A1 | 11/2014 | Taquet et al. |

FOREIGN PATENT DOCUMENTS

| DE | 4003422 A1 | 8/1991 |
| DE | 4213965 A1 | 11/1993 |
| DE | 19832668 A1 | 1/2000 |
| DE | 10335958 A1 | 2/2005 |
| DE | 102014103924 A1 | 10/2014 |
| EP | 0040419 A2 | 11/1981 |
| EP | 0567812 A1 | 11/1993 |
| EP | 0614922 A2 | 9/1994 |
| EP | 2431341 A1 | 3/2012 |
| FR | 2763937 A3 | 12/1998 |
| WO | 2007/057365 A2 | 5/2007 |
| WO | 2015/110301 A1 | 7/2015 |
| WO | 2017/067952 A1 | 4/2017 |
| WO | 2017/067956 A1 | 4/2017 |
| WO | 2017/076807 A1 | 5/2017 |
| WO | 2017/093703 A1 | 6/2017 |

OTHER PUBLICATIONS

Machine Translation of France Patent Specification No. FR 2763937 A3 (Year: 1998).*
Machine Translation of PCT International Patent Application No. WO 2017/076807 A1. (Year: 2017).*
Machine Translation of PCT International Patent Application No. WO 2017/093703 A1. (Year: 2017).*
International Preliminary Reporton Patentability received for PCT Patent Application No. PCT/EP2019/066140, dated Jan. 7, 2021, 17 pages (9 pages of English Translation and 8 pages of Original Document).
International Search Report and Written Opinion received for PCT Patent Application No. PCT/EP2019/066140, dated Sep. 6, 2019, 23 pages (10 pages of English Translation and 13 pages of Original Document).

* cited by examiner

*Primary Examiner* — Anthony J Green
(74) *Attorney, Agent, or Firm* — Faegre Drinker Biddle & Reath LLP

(57) ABSTRACT

A two-component system for forming adhesive bonds or for chemical anchoring comprises a curable binder component A and an activator component B. The component A comprises: A-1) an inhibited hydraulic binder selected from among calcium aluminate cement, calcium sulfoaluminate cement and mixtures thereof; the component B comprises: B-1) a curing activator. At least one of the components A and/or B comprises: V-1) an organic binder; and V-2) a filler having a Mohs hardness of at least 5. The system is an aqueous system which is unproblematical from a health point of view. It is easy to process and quickly attains high strengths.

8 Claims, No Drawings

TWO-COMPONENT SYSTEM FOR FORMATION OF COHESIVE BONDS OR FOR CHEMICAL ANCHORING

CROSS-REFERENCE TO RELATED APPLICATIONS

This application is a national stage application (under 35 U.S.C. § 371) of PCT/EP2019/066140, filed Jun. 19, 2019, which claims benefit of European Application No. 18179576.6, filed Jun. 25, 2018, both of which are incorporated herein by reference in their entirety.

The invention relates to a two-component system for forming adhesive bonds or for chemical anchoring and a process for forming adhesive bonds or chemical anchoring.

For anchoring fastening elements in drilled holes, use is made not only of frictional anchorings and positive locking anchorings, e.g. by means of pegs, but frequently also adhesive anchorings by means of organic and/or inorganic mortar compositions. Adhesive anchorings of fastening elements are used, for example, in fastenings where the spacing is critical and/or in the tensile zone of components. A further use of adhesive anchorings by means of organic and/or inorganic mortar compositions is the subsequent introduction of iron reinforcement into concrete. This can, for example, be necessary in repair work or for subsequent strengthening of floors or ceilings, or in the attachment of extensions to existing building works. The iron reinforcement is also fastened by means of adhesive anchoring in subsequent connections and in the production of overlapping joints of iron reinforcement in steel and concrete construction.

For this purpose, a drilled hole produced in the component or an opening in masonry is firstly filled with a single-component or multicomponent mortar composition in paste form in order to allow subsequent introduction of components such as screws, threaded rods, hooks, iron reinforcement, etc. The adhesive anchoring is then effected by curing of the mortar system. This makes sufficient securing of the connection possible, even when the load-bearing capability of the masonry or adjoining components itself or the withdrawal force of conventional pegs in the shell of a building (exterior walls, roof, balconies, terraces, cellars) or in infrastructure constructions such as bridges, tunnel constructions, pipeline construction, etc., is not sufficient.

Masonry injection mortars of this type are known from the prior art, for example as two-component (resin component+hardener component based on epoxide, polyurethane, polyester or polymethyl methacrylate) or single-component (cement-based) reactive systems for reinforcement connections and heavy load fastenings. Firstly, the systems should provide sufficient strength for the structural holding function, and secondly require a short curing time in order to allow swift progression of construction. This should preferably be achieved without posing health hazards to the processors and later users.

Reactive injection mortar systems which have hitherto been available on the market meet the structural requirements well, but owing to their reactive components often pose a health risk to the processors. Volatile monomers, isocyanate systems or epoxy systems are of concern in the case of contact with skin and on inhalation. This can be seen from, for example, the hazard labeling on the sales containers (Hazard Statement, CLP), e.g. H314—Causes severe skin burns and eye damage, H317—May cause an allergic skin reaction, H335—May cause respiratory irritation, H360F—May damage fertility, etc.

US 2014/0343194 describes stabilized aqueous quick-setting cement suspensions having a high storage stability. They comprise a phosphorus-comprising compound such as phosphoric acid for passivating the quick-setting cement. The reactivation of the cement is achieved by increasing the pH.

WO 2017/067952 discloses a two-component system for the refractory chemical anchoring of anchors or retrofitted reinforcement. The system comprises a curable binder component A and an activator component B, with the component A comprising an inhibited curable aluminate cement. Although this purely inorganic system leads to hard joints, these have low resistance to vibrational stresses because of embrittlement. In addition, the adhesion capability to fastening elements, e.g. steel fastening elements, is frequently unsatisfactory.

It is therefore an object of the present invention to remedy the disadvantages of the prior art. Health hazards for the users should be largely avoided and all other requirements such as satisfactory final strength, curing under conditions typical for building sites in respect of temperature and ambient moisture and/or processing procedures with which the user of such systems is familiar should nevertheless be maintained.

The object is achieved by a two-component system for forming adhesive bonds, such as adhesive joints, or for chemical anchoring, comprising a curable binder component A and an activator component B, wherein the component A comprises:
A-1) an inhibited hydraulic binder selected from among calcium aluminate cement, calcium sulfoaluminate cement and mixtures thereof;
the component B comprises:
B-1) a curing activator;
and at least one of the components A and/or B comprises:
V-1) an organic binder; and
V-2) a filler having a Mohs hardness of at least 5.

The component A comprises a hydraulic binder which is present as aqueous suspension. The component is an aluminate cement, namely calcium aluminate cement, calcium sulfoaluminate cement or a mixture thereof.

Aluminate cements are combinations of aluminum oxide $Al_2O_3$, abbreviated as "A" in cement nomenclature, with calcium oxide CaO, "C" in cement nomenclature, in such amounts that C+A make up at least 20% to 100% of the total weight of the cement. Calcium sulfoaluminate cements correspond to compounds comprising calcium oxide (CaO, "C"), aluminum oxide ($Al_2O_3$, "A") and sulfur oxide ("S") in such amounts that C+A+S make up at least 10% to 100% of the total weight of the cement.

The suspension can also comprise further pozzolanic materials such as slag, slag sands, microsilica and fly ash in addition to the aluminate cement. The amount of further pozzolanic materials has to be such that the properties of the binder are not significantly impaired.

In order for the hydraulic binder not to cure prematurely or the viscosity of the suspension to increase, the hydraulic binder is inhibited by addition of a setting inhibitor (blocking agent). The setting inhibitor serves to passivate the hydraulic binder so as to prevent it from setting prematurely. The setting inhibitor prevents dissolution of the cement phase, which precedes setting. The suspension of the inhibited hydraulic binder remains liquid and does not set for preferably at least one month, preferably at least six months and particularly preferably at least one year, at ambient temperature. Curing is triggered in a controlled manner by means of a curing activator as described below.

Suitable setting inhibitors are oxo acids of phosphorus, e.g. orthophosphoric acid, metaphosphoric acid, phosphonic acid (phosphorous acid); organophosphates or boron compounds such as borax or boric acid.

Further suitable setting inhibitors are derivatives of the oxo acids of phosphorus which form these acids in aqueous medium. Examples are phosphorus pentoxide, phosphorus trioxide, pyrophosphoric acid or tripolyphosphoric acid. Suitable phosphonic acid derivatives are, for example, aminotrimethylenephosphonic acid, aminoethylphosphonic acid, 1-hydroxyethylidene-1,1-diphosphonic acid, tetramethylenediaminetetramethylenephosphonic acid, hexamethylenediaminetetramethylenephosphonic acid, diethylenetriaminepentamethylenephosphonic acid, phosphonobutanetricarboxylic acid, N-(phosphonomethyl)iminodiacetic acid, 2-carboxyethylphosphonic acid or 2-hydroxyphosphonocarboxylic acid. Preferred inhibitors are boric acid and orthophosphoric acid.

To prepare the inhibited hydraulic binder, it is possible to place an aqueous solution of the setting inhibitor in a vessel and introduce the hydraulic binder into the aqueous solution, advantageously with stirring.

Suspensions of inhibited hydraulic binders based on aluminate cement are commercially available, e.g. under the name Exalt® from Kerneos, France.

The component A preferably additionally comprises a retarder for the setting of the aluminate cement. The retarder makes it possible to set a sufficient processing time from when the inhibited hydraulic binder has been activated. In embodiments in which the organic binder is comprised in the component B, a setting retarder can be dispensed with.

Suitable retarders are lignosulfonates; cellulose derivatives such as hydroxyethyl cellulose, carboxymethyl hydroxyethyl cellulose; hydroxycarboxylic acids such as tartaric acid, gluconic acid, gluconates such as sodium gluconate, gluconic acid lactone, heptonic acid, citric acid, gallic acid, pyrogallol, malic acid, tartronic acid, 2,4,6-trihydroxybenzoic acid and also alkali metal salts thereof; synthetic retarders such as 2-acrylamido-2-methylpropanesulfonic acid (AMPS) copolymers; and inorganic compounds such as ZnO.

The product obtainable under the name Lohtragon SCI Plus from Dr. Paul Lohmann GmbH, Emmerthal, Germany (trisodium citrate 2-hydrate), for example, is suitable as retarder.

Preference is given to at least one of the components A and/or B, in particular the component B, additionally comprising a curing accelerator. The curing accelerator ensures rapid and complete curing of the hydraulic binder as soon as the hardening is initiated by addition of the hardening activator, optionally after a processing time which can be set by addition of a retarder.

The curing accelerator is preferably selected from among lithium carbonate, lithium sulfate, lithium acetate, lithium silicate, sodium carbonate, sodium sulfate, sodium silicate, sodium aluminate, potassium chloride, potassium silicate, calcium formate, calcium chloride, calcium silicate hydrate, calcium aluminate and aluminum salts such as aluminum sulfate and mixtures thereof.

Suitable curing accelerators are, for example, the products obtainable under the name Lohtragon LCA 261, Lohtragon LCA 332 and Lohtragon LCA 442 from Dr. Paul Lohmann GmbH, Emmerthal, Germany. Peramin AXL 80 from Kerneos, France, is also suitable.

At least one of the components A and/or B comprises an organic binder. The organic binder gives the cured composition desired properties such as improved strength and adhesion properties, flexibility and sealing capability.

The organic binder is a natural or synthetic polymer or copolymer. The polymer or copolymer is preferably made up of ethylenically unsaturated compounds in polymerized form. The preparation of these polyaddition compounds is generally carried out by metal complex-catalyzed, anionically catalyzed, cationically catalyzed and particularly preferably free-radically catalyzed polymerization, as is familiar to a person skilled in the art, of ethylenically unsaturated compounds.

The organic binder can be employed in the form of an aqueous polymer dispersion which generally comprises from 30 to 80% by weight, in particular from 50 to 75% by weight, of polymer, based on the total amount of the polymer emulsion. However, the organic binder can also be used in the form of a polymer powder.

Aqueous polyurethane dispersions are also possible as organic binder.

In order to achieve bonds which are sufficiently strong and load-bearing for hard adhesive joints and chemical anchoring, the organic binder preferably has a glass transition temperature Tg of $-20°$ C. or above, preferably $0°$ C. or above, in particular $15°$ C. or above. For the purposes of the present invention, the glass transition temperature Tg is the midpoint temperature in accordance with ASTM D 3418-12, determined by differential scanning calorimetry (DSC; heating rate: 20 K/min) [cf. also Ullmann's Encyclopedia of Industrial Chemistry, page 169, Verlag Chemie, Weinheim, 1992 and Zosel in Farbe and Lack, 82, pages 125 to 134, 1976].

According to Fox (T. G. Fox, Bull. Am. Phys. Soc. 1956 [Ser. II] 1, page 123 and as described in Ullmann's Encyclopadie der technischen Chemie, Vol. 19, page 18, 4th edition, Verlag Chemie, Weinheim, 1980), the glass transition temperature of at most weakly crosslinked copolymers can be estimated to a good approximation by the following equation $$1/Tg = x^1/Tg^1 + x^2/Tg^2 + \ldots x^n/Tg^n,$$

where $x^1, x^2, \ldots x^n$ are the mass fractions of the monomers 1, 2, n and $Tg^1, Tg^2, \ldots Tg^n$ are the glass transition temperatures of the respective homopolymers made up of only one of the monomers 1, 2, ... n in kelvin. The glass transition temperatures of these homopolymers of the usually ethylenically unsaturated monomers are known (or can be determined experimentally in a simple way which is known per se) and are set forth in, for example, J. Brandrup, E. H. Immergut, Polymer Handbook 1st Ed. J. Wiley, New York, 1966, 2nd Ed. J. Wiley, New York, 1975 and 3rd Ed. J. Wiley, New York, 1989, and also in Ullmann's Encyclopedia of Industrial Chemistry, page 169, Verlag Chemie, Weinheim, 1992.

The dispersion polymers are particularly advantageously present in the form of particles having an average particle diameter of from 10 to 1000 nm, advantageously from 30 to 600 nm and particularly advantageously from 50 to 400 nm, measured by the pseudoelastic light scattering method (ISO standard 13 321; cumulant z-average).

The free-radically catalyzed polymerization of ethylenically unsaturated compounds will be familiar to a person skilled in the art and is, in particular, carried out by the method of free-radical bulk, emulsion, solution, precipitation or suspension polymerization, with free-radically initiated aqueous emulsion polymerization being particularly preferred.

Carrying out free-radically initiated emulsion polymerization of ethylenically unsaturated compounds (monomers) in an aqueous medium is known [cf. Emulsion polymerization in Encyclopedia of Polymer Science and Engineering, Vol. 8, pages 659 ff. (1987); D. C. Blackley, in High Polymer Latices, Vol. 1, pages 35 ff. (1966); H. Warson, The Applications of Synthetic Resin Emulsions, chapter 5, pages 246 ff. (1972); D. Diederich, Chemie in unserer Zeit 24, pages 135 to 142 (1990); Emulsion Polymerisation, Interscience Publishers, New York (1965); DE-A 40 03 422 and Dispersionen synthetischer Hochpolymerer, F. Hölscher, Springer-Verlag, Berlin (1969)]. Free-radically initiated aqueous emulsion polymerization is usually carried out by dispersing the monomers, generally with concomitant use of dispersants such as emulsifiers and/or protective colloids, in an aqueous medium and polymerizing them by means of at least one water-soluble free-radical polymerization initiator. Frequently, the residual contents of unreacted monomers in the aqueous polymer dispersions obtained are decreased by chemical and/or physical after-treatment, the polymer solids content is set to a desired value by dilution or concentration or further customary additives, for example foam- or viscosity-modifying additives, are added to the aqueous polymer dispersion.

Possible monomers are, in particular, monomers which can be free-radically polymerized in a simple manner, for example ethylene, vinylaromatic monomers such as styrene, α-methylstyrene, o-chlorostyrene or vinyltoluenes, vinyl halides such as vinyl chloride or vinylidene chloride, esters of vinyl alcohol and monocarboxylic acids having from 1 to 18 carbon atoms, e.g. vinyl acetate, vinyl propionate, vinyl n-butyrate, vinyl laurate and vinyl stearate, esters of α,β-monoethylenically unsaturated monocarboxylic and dicarboxylic acids which preferably have from 3 to 6 carbon atoms, in particular acrylic acid, methacrylic acid, maleic acid, fumaric acid and itaconic acid, with alkanols which generally have from 1 to 12, preferably from 1 to 8 and in particular from 1 to 4, carbon atoms, especially methyl, ethyl, n-butyl, isobutyl, pentyl, hexyl, heptyl, octyl, nonyl, decyl and 2-ethylhexyl acrylates and methacrylates, dimethyl or di-n-butyl fumarate and maleate, nitriles of α,β-monoethylenically unsaturated carboxylic acids, e.g. acrylonitrile, methacrylonitrile, fumaronitrile, maleonitrile, and also C4-8-conjugated diener such as 1,3-butadiene and isoprene. The monomers mentioned generally form the main monomers which, based on the amount of all ethylenically unsaturated compounds used for preparing the dispersion polymer (total amount of monomers), add up to a proportion of ≥50% by weight, preferably ≥80% by weight and particularly preferably ≥90% by weight. In general, these monomers have only a moderate to low solubility in water under standard conditions [20° C., 1 atm (=1.013 bar absolute)].

Monomers which have an increased water solubility under the abovementioned conditions are those which comprise either at least one acid group and/or the corresponding anion or at least one amino, amido, ureido or N-heterocyclic group and/or the ammonium derivatives thereof which are protonated or alkylated on the nitrogen. Examples which may be mentioned are α,β-monoethylenically unsaturated monocarboxylic and dicarboxylic acids and amides thereof, e.g. acrylic acid, methacrylic acid, maleic acid, fumaric acid, itaconic acid, acrylamide and methacrylamide, also vinylsulfonic acid, 2-acrylamido-2-methylpropanesulfonic acid, styrenesulfonic acid and water-soluble salts thereof and also N-vinylpyrrolidone, 2-vinylpyridine, 4-vinylpyridine, 2-vinylimidazole, 2-(N,N-di methylamino)ethyl acrylate, 2-(N,N-dimethylamino)ethyl methacrylate, 2-(N,N-diethylamino)ethyl acrylate, 2-(N,N-diethylamino)ethyl methacrylate, 2-(N-tert-butylamino)ethyl methacrylate, N-(3-N',N'-dimethylaminopropyl)methacrylamide and 2-(1-imidazolin-2-onyl)ethyl methacrylate. Normally, the abovementioned monomers are comprised only as modifying monomers in amounts of ≤10% by weight and preferably ≤5% by weight, based on the total amount of monomers.

Monomers which usually increase the internal strength of the films of the polymer matrix normally have at least one epoxy, hydroxy, N-methylol, silane or carbonyl group, or at least two nonconjugated ethylenically unsaturated double bonds. Examples are glycidyl methacrylate, acetoacetoxyethyl methacrylate, methacryloxypropyltrimethoxysilane, vinyltriethoxysilane and also monomers having two vinyl radicals, monomers having two vinylidene radicals and also monomers having two alkenyl radicals. The diesters of dihydric alcohols with α,β-monoethylenically unsaturated monocarboxylic acids, among which acrylic and methacrylic acid are preferred, are particularly advantageous. Examples of such monomers having two nonconjugated ethylenically unsaturated double bonds are alkylene glycol diacrylates and dimethacrylates, e.g. ethylene glycol diacrylate, 1,2-propylene glycol diacrylate, 1,3-propylene glycol diacrylate, 1,3-butylene glycol diacrylate, 1,4-butylene glycol diacrylate and ethylene glycol dimethacrylate, 1,2-propylene glycol dimethacrylate, 1,3-propylene glycol dimethacrylate, 1,3-butylene glycol dimethacrylate, 1,4-butylene glycol dimethacrylate, and also divinylbenzene, vinyl methacrylate, vinyl acrylate, allyl methacrylate, allyl acrylate, diallyl maleate, diallyl fumarate, methylenebisacrylamide, cyclopentadienyl acrylate, triallyl cyanurate or triallyl isocyanurate. The $C_1$-$C_8$-hydroxyalkyl methacrylates and acrylates, e.g. n-hydroxyethyl, n-hydroxypropyl or n-hydroxybutyl acrylate and methacrylate, and also compounds such as diacetoneacrylamide and acetylacetoxyethyl acrylate or methacrylate are also of particular importance in this context. The abovementioned monomers are frequently used in amounts of ≤5% by weight, but preferably in amounts of ≤3% by weight, in each case based on the total amount of monomers.

According to the invention, it is advantageous to use aqueous polymer dispersions whose dispersion polymer comprises from 50 to 99.9% by weight of esters of acrylic and/or methacrylic acid with alkanols having from 1 to 12 carbon atoms and/or styrene, or from 40 to 99.9% by weight of styrene and/or butadiene, or from 50 to 99.9% by weight of vinyl chloride and/or vinylidene chloride, or from 40 to 99.9% by weight of vinyl acetate, vinyl propionate and/or ethylene in polymerized form.

It is particularly advantageous according to the invention to use aqueous polymer dispersions whose dispersion polymers comprise from 0.1 to 5% by weight of at least one α,β-monoethylenically unsaturated monocarboxylic and/or dicarboxylic acid having from 3 to 6 carbon atoms and/or an amide thereof and from 50 to 99.9% by weight of at least one ester of acrylic and/or methacrylic acid with alkanols having from 1 to 12 carbon atoms and/or styrene, or from 0.1 to 5% by weight of at least one α,β-monoethylenically unsaturated monocarboxylic and/or dicarboxylic acid having from 3 to 6 carbon atoms and/or an amide thereof and from 40 to 99.9% by weight of styrene and/or butadiene, or from 0.1 to 5% by weight of at least one α,β-monoethylenically unsaturated monocarboxylic and/or dicarboxylic acid having from 3 to 6 carbon atoms and/or an amide thereof and from 50 to 99.9% by weight of vinyl chloride and/or vinylidene chloride, or from 0.1 to 5% by weight of at least one α,β-monoethylenically unsaturated monocarboxylic and/or dicarboxylic acid having from 3 to 6 carbon atoms and/or an amide thereof and from 40 to 99.9% by weight of vinyl acetate, vinyl propionate and/or ethylene, in polymerized form.

The free-radically initiated aqueous emulsion polymerization for preparing the dispersion polymers is generally carried out in the presence of from 0.1 to 5% by weight, preferably from 0.1 to 4% by weight and in particular from 0.1 to 3% by weight, in each case based on the total amount of monomers, of a free-radical polymerization initiator (free-radical initiator). Possible free-radical initiators are all those which are able to initiate a free-radical aqueous emulsion polymerization. They can in principle be either peroxides or azo compounds. Of course, redox initiator systems are also possible. As peroxides, it is in principle possible to use inorganic peroxides such as hydrogen peroxide or peroxodisulfates such as the mono-alkali metal or di-alkali metal or ammonium salts of peroxodisulfuric acid, for example the monosodium, disodium, monopotassium, dipotassium or ammonium salts thereof, or organic peroxides such as alkyl hydroperoxides, for example tert-butyl, p-menthyl or cumyl hydroperoxide, and also dialkyl or diaryl peroxides such as di-tert-butyl or dicumyl peroxide. As azo compound, use is made mainly of 2,2'-azobis(isobutyronitrile), 2,2'-azobis(2,4-dimethylvaleronitrile) and 2,2'-azobis(amidinopropyl) dihydrochloride (AIBA, corresponds to V-50 from Wako Chemicals). Of course, it is also possible to use redox initiator systems as free-radical initiators. Possible oxidants for the redox initiator systems are mainly the abovementioned peroxides. As corresponding reducing agent, it is possible to use sulfur compounds in a relatively low oxidation state, e.g. alkali metal sulfites, for example potassium and/or sodium sulfite, alkali metal hydrogensulfites, for example potassium and/or sodium hydrogensulfite, alkali metal bisulfites, for example potassium and/or sodium metabisulfite, formaldehyde sulfoxylates, for example potassium and/or sodium formaldehyde sulfoxylate, alkali metal salts, especially potassium and/or sodium salts, of aliphatic sulfinic acids and alkali metal hydrogensulfides, for example potassium and/or sodium hydrogensulfide, salts of polyvalent metals, e.g. iron(II) sulfate, iron(II) ammonium sulfate, iron(II) phosphate, enediols such as dihydroxymaleic acid, benzoin and/or ascorbic acid and also reducing saccharides such as sorbose, glucose, fructose and/or dihydroxyacetone.

In the preparation of the dispersion polymers by free-radically initiated aqueous emulsion polymerization, dispersants which keep both the monomer droplets and also polymer particles dispersed in the aqueous phase and thus ensure the stability of the aqueous dispersions of the dispersion polymers produced are usually concomitantly used. Possible dispersants are both the protective colloids customarily used for carrying out free-radical aqueous emulsion polymerizations and also emulsifiers.

Suitable protective colloids are, for example, polyvinyl alcohols, cellulose derivatives or copolymers comprising vinylpyrrolidone. A comprehensive description of further suitable protective colloids may be found in Houben-Weyl, Methoden der organischen Chemie, volume XIV/1, Makromolekulare Stoffe, pages 411 to 420, Georg-Thieme-Verlag, Stuttgart, 1961. Of course, it is also possible to use mixtures of emulsifiers and/or protective colloids. Preference is given to using exclusively emulsifiers, which in contrast to the protective colloids usually have relative molecular weights below 1000, as dispersants. They can be either anionic, cationic or nonionic in nature. When mixtures of interface-active substances are used, the individual components of course have to be compatible with one another, which in the case of doubt can be checked by means of a few preliminary tests. In general, anionic emulsifiers are compatible with one another and with nonionic emulsifiers. The same applies to cationic emulsifiers, while anionic and cationic emulsifiers are usually not compatible with one another. Useful emulsifiers are, for example, ethoxylated monoalkylphenols, dialkylphenols and trialkylphenols (EO content: from 3 to 50, alkyl radical: $C_4$ to $C_{12}$), ethoxylated fatty alcohols (EO content: from 3 to 50; alkyl radical: C8 to C36) and alkali metal and ammonium salts of alkylsulfates (alkyl radical: C8 to C12), of sulfuric monoesters of ethoxylated alkanols (EO content: from 4 to 30, alkyl radical: $C_{12}$ to $C_{18}$) and ethoxylated alkylphenols (EO content: from 3 to 50; alkyl radical: $C_4$ to $C_{12}$), of alkylsulfonic acids (alkyl radical: $C_{12}$ to $C_{18}$) and of alkylarylsulfonic acids (alkyl radical: $C_9$ to $C_{18}$). Further suitable emulsifiers may be found in Houben-Weyl, Methoden der organischen Chemie, volume XIV/1, Makromolekulare Stoffe, pages 192 to 208, Georg-Thieme-Verlag, Stuttgart, 1961.

Furthermore, compounds of the general formula I

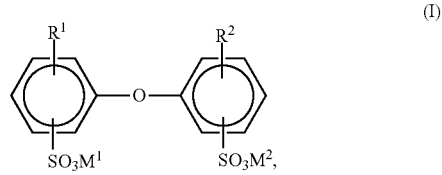

where $R^1$ and $R^2$ are H atoms or $C_4$-$C_{24}$-alkyl and are not both H atoms and $M^1$ and $M^2$ can be alkali metal ions and/or ammonium ions, have been found to be suitable as interface-active substances. In the general formula (I), $R^1$ and $R^2$ are preferably linear or branched alkyl radicals having from 6 to 18 carbon atoms, in particular having 6, 12 and 16 carbon atoms, or hydrogen, with $R^1$ and $R^2$ not both being H atoms at the same time. $M^1$ and $M^2$ are preferably sodium, potassium or ammonium, with sodium being particularly preferred. Compounds (I) in which $M^1$ and $M^2$ are each sodium, R1 is a branched alkyl radical having 12 carbon atoms and $R^2$ is an H atom or R1 are particularly advantageous. Use is frequently made of industrial mixtures which have a proportion of from 50 to 90% by weight of the monoalkylated product, for example Dowfax® 2A1 (brand of the Dow Chemical Company). The compounds (I) are generally known, e.g. from U.S. Pat. No. 4,269,749, and are commercially available.

Nonionic and/or anionic emulsifiers are advantageously used in the preparation of the dispersion polymers by free-radically initiated aqueous emulsion polymerization.

In general, the amount of dispersant used is from 0.1 to 5% by weight, preferably from 1 to 3% by weight, in each case based on the total amount of monomers. It is frequently advantageous for a partial amount or the total amount of the dispersant to be added to the aqueous reaction medium before initiation of the free-radical polymerization. In addition, a partial amount or the total amount of the dispersant can advantageously also be fed together with the monomers, in particular in the form of an aqueous monomer emulsion, into the aqueous reaction medium during the polymerization.

Chain transfer agents are usually employed in order to reduce or control the molecular weight of the polymer A dispersion polymers obtainable by means of a free-radically initiated aqueous emulsion polymerization. Use is here made mainly of aliphatic and/or araliphatic halogen compounds, for example n-butyl chloride, n-butyl bromide, n-butyl iodide, methylene chloride, ethylene dichloride, chloroform, bromoform, bromotrichloromethane, dibromodichloromethane, carbon tetrachloride, carbon tetrabromide, benzyl chloride, benzyl bromide, organic thio compounds such as primary, secondary or tertiary aliphatic thiols, for example ethanethiol, n-propanethiol, 2-propanethiol, n-butanethiol, 2-butanethiol, 2-methyl-2-propanethiol, n-pentanethiol, 2-pentanethiol, 3-pentanethiol, 2-methyl-2-butanethiol, 3-methyl-2-butanethiol, n-hexanethiol, 2-hexanethiol, 3-hexanethiol, 2-methyl-2-pentanethiol, 3-methyl-2-pentanethiol, 4-methyl-2-pentanethiol, 2-methyl-3-pentanethiol, 3-methyl-3-pentanethiol, 2-ethylbutanethiol, 2-ethyl-2-butanethiol, n-heptanethiol and isomers thereof, n-octanethiol and isomers thereof, n-nonanethiol and isomers thereof, n-decanethiol and isomers thereof, n-undecanethiol and isomers thereof, n-dodecanethiol and isomers thereof, n-tridecanethiol and isomers thereof, substituted thiols such as 2-hydroxyethanethiol, aromatic thiols such as benzenethiol, ortho-, meta- or para-methylbenzenethiol, and also all further sulfur compounds described in the Polymer Handbook 3rd edition, 1989, J. Brandrup and E. H. Immergut, John Weiley & Sons, section II, pages 133 to 141, and also aliphatic and/or aromatic aldehydes such as acetaldehyde, propionaldehyde and/or benzaldehyde, unsaturated fatty acids such as oleic acid, diener having nonconjugated double bonds, e.g. divinylmethane or vinylcyclohexane, or hydrocarbons having readily abstractable hydrogen atoms, for example toluene. However, it is also possible to use mixtures of noninterfering chain transfer agents as mentioned above.

Apart from the seed-free mode of operation, the emulsion polymerization for preparing the dispersion polymers P can be carried out by the seed latex process or in the presence of a seed latex prepared in situ in order to set the polymer particle size. Processes of this type are known to those skilled in the art and can be found in the prior art (see, for example, EP-B 40 419, EP-A 567 812, EP-A 614 922 and also 'Encyclopedia of Polymer Science and Technology', vol. 5, page 847, John Wiley & Sons Inc., New York, 1966). Thus, the prior art recommends, in the semicontinuous feed stream process, placing a defined finely particulate seed polymer dispersion in the polymerization vessel and then polymerizing the monomers in the presence of the seed latex. Here, the seed polymer particles act as "polymerization nuclei" and decouple the polymer particle formation and the polymer particle growth. During the emulsion polymerization, further seed latex can be introduced directly into the polymerization reactor. This gives broad size distributions of the polymer particles which are often desirable, especially in the case of polymer dispersions having a high solids content (cf., for example, DE-A 4213965). Instead of the addition of a defined seed latex, this can also be produced in situ. For this purpose, a partial amount of the monomers used for the polymerization and of the free-radical initiator is, for example, initially charged together with a partial amount or the total amount of the emulsifier and heated to the reaction temperature, forming relatively finely particulate polymer seed. The actual polymerization is subsequently carried out in the same polymerization vessel by the feed stream process (see also DE-A 4213965).

The preparation of the dispersion polymers by free-radically initiated aqueous emulsion polymerization is advantageously carried out at a reaction temperature in the range from 0 to 170° C., with temperatures of from 70 to 120° C. and in particular from 80 to 100° C. being particularly preferred. The free-radical aqueous emulsion polymerization can be carried out at a pressure of less than, equal to or greater than 1 atm (absolute). Volatile monomers such as ethylene, butadiene or vinyl chloride are advantageously polymerized under superatmospheric pressure. Here, the pressure can assume values of 1.2, 1.5, 2, 5, 10, 15 bar (gauge pressure) or even higher values. If emulsion polymerizations are carried out under subatmospheric pressure, pressures of 950 mbar, frequently 900 mbar and often 850 mbar (absolute) are set. The free-radical aqueous emulsion polymerization is advantageously carried out at 1 atm (=atmospheric pressure=1 013 bar absolute) under an inert gas atmosphere, for example under nitrogen or argon.

Aqueous polyurethane dispersions consist of polyurethane polymers or polyurethane-polyurea polymers which are obtainable by polyaddition reactions of polyols, polyisocyanates and polyamines. Polyurethane prepolymers are firstly prepared from the polyols and the polyisocyanates and these are then dispersed in the aqueous phase and chain-extended with polyamines to build up the polyurethane-polyurea polymers.

The polyurethane polymers additionally comprise a sufficient amount of hydrophilic groups which ensure stabilization in the aqueous phase. These hydrophilic groups are anionic, cationic or nonionic groups. Polyurethane dispersions are two-phase systems which consist of micelles comprising polyurethane polymers and an aqueous phase. When the polyurethane dispersions are dried, coalescence or fusion of the micelles and film formation or filming of the polyurethane polymers occurs.

At least one of the components A and/or B further comprises a filler having a Mohs hardness of at least 5, in particular at least 6. The Mohs hardness is a relative hardness value of minerals. The Mohs hardness comprises a value range from 1 to 10 on an ordinal scale. Each mineral assigned to this scale scratches the previous one and is itself scratched by the next one. The indicated Shore hardness is important in order to achieve sufficiently strong and load-bearing bonds for hard adhesion joints and chemical anchoring. The filler is, for example, appropriately selected from among sand, a-alumina, gravel, ground rock, glass flour, glass spheres, hollow glass spheres, glass fibers, metal fibers and pyrogenic silicon dioxide. The filler preferably has a weight average particle size of from 1 µm to 100 µm, in particular from 5 µm to 50 µm.

The component A and/or component B can also comprise additives such as rheology modifiers, in particular thickeners, hydrophobicizing agents, filmforming auxiliaries, plasticizers, biocides and/or preservatives or combinations thereof.

As thickeners, it is possible to use both organic and inorganic thickeners.

Suitable organic thickeners are selected from among cellulose ethers, starch ethers, polyacrylamides and associative thickeners. In a further embodiment, the thickener is selected from among polysaccharide derivatives and (co)polymers having a weight average molecular weight Mw of more than 500 000 g/mol, in particular more than 1 000 000 g/mol. In a further embodiment, the thickener is selected from among cellulose ethers, starch ethers and (co)polymers comprising structural units of nonionic (meth)acrylamide monomers and/or sulfonic acid monomers and optionally further monomers.

Suitable cellulose ethers are alkyl celluloses such as methyl cellulose, ethyl cellulose, propyl cellulose and methyl ethyl cellulose; hydroxyalkyl celluloses such as hydroxyethyl cellulose (HEC), hydroxypropyl cellulose (HPC) and hydroxyethyl hydroxypropyl cellulose; alkyl hydroxyalkyl celluloses such as methyl hydroxyethyl cellulose (MHEC), methyl hydroxypropyl cellulose (MHPC) and propyl hydroxypropyl cellulose; and carboxylated cellulose ethers such as carboxymethyl cellulose (CMC). Preference is given to nonionic cellulose ether derivatives, in particular methyl cellulose (MC), 20 hydroxypropyl cellulose (HPC), hydroxyethyl cellulose (HEC) and ethyl hydroxyethyl cellulose (EHEC), and particular preference is given to methyl hydroxyethyl cellulose (MHEC) and methylhydroxypropyl cellulose (MHPC). The cellulose ether derivatives are in each case obtainable by appropriate alkylation and alkoxylation of cellulose and are commercially available.

Suitable starch ethers are nonionic starch ethers such as hydroxypropyl starch, hydroxyethyl starch and methyl hydroxypropyl starch. Preference is given to hydroxypropyl starch. Microbially produced polysaccharides such as welan gum and/or xanthans and naturally occurring polysaccharides such as alginates, carrageenans and galactomannans are also suitable thickeners. These can be obtained from corresponding natural products by extractive processes, for example 30 in the case of alginates and carrageenans from algae, in the case of galactomannans from carob beans.

(Co)polymers having a weight average molecular weight MW of more than 500 000 g/mol, particularly preferably more than 1 000 000 g/mol, can be prepared from nonionic (meth)acrylamide monomers and/or sulfonic acid monomers (preferably by free-radical polymerization). In one embodiment, the monomers are selected from among acrylamide, methacrylamide, N-methylacrylamide, N-methylmethacrylamide, N,N-dimethylacrylamide, N-ethylacrylamide, N,N-diethylacrylamide, N-cyclohexylacrylamide, N-benzylacrylamide, N,N-dimethylaminopropylacrylamide, N,N-dimethylaminoethylacrylamide and/or N-tert-butylacrylamide and/or styrenesulfonic acid, 2-acrylamino-2-methylpropanesulfonic acid, 2-methacrylamido-2-methylpropanesulfonic acid, 2-acrylamidobutanesulfonic acid and/or 2-acrylamido-2,4,4-trimethylpentanesulfonic acid or salts of the acids mentioned. The (co)polymers preferably comprise more than 50 mol % and particularly preferably more than 70 mol % of structural units which are derived from nonionic (meth)acrylamide monomers and/or sulfonic acid monomers. Other structural units which can be comprised in the copolymers are derived from, for example, the monomers (meth)acrylic acid, esters of (meth)acrylic acids with branched or unbranched $C_1$-$C_{10}$-alcohols, vinyl acetate, vinyl propionate and/or styrene.

In a further embodiment, the thickener is selected from among methyl cellulose, hydroxypropyl cellulose, hydroxyethyl cellulose, ethyl hydroxyethyl cellulose, hydroxypropyl starch, hydroxyethyl starch, methyl hydroxypropyl starch and (co)polymers comprising structural units which are derived from acrylamide, methacrylamide, N,N-dimethylacrylamide, 2-acrylamido-2-methylpropanesulfonic acid and optionally (meth)acrylic acid, esters of (meth)acrylic acids with branched or unbranched $C_1$-$C_{10}$-alcohols, vinyl acetate, vinyl propionate and/or styrene.

Preference is given to using associative thickeners such as the polyurethane associative thickeners which are known per se, e.g. Rheovis® or PURE THIX, e.g. Rheovis PU 1270. These thickeners are made up of linear and/or branched polyethylene glycol blocks and hydrophobic segments which are generally linked via urethane groups.

Suitable inorganic thickeners are, for example, sheet silicates such as montmorillonite, hectorite, attapulgite or smectite. Suitable sheet silicates are, for example, Laponite RD (Deutsche Solvay GmbH); Optigel SH; SKS-20/Saponite; Attagel 50; SKS-21/Hectorite. Pyrogenic silicas such as Aerosil grades (Evonik Resource Efficiency GmbH) are also suitable as thickeners.

Furthermore, natural or synthetic fibers can also be added, e.g. for reinforcement. Intumescent or fire-inhibiting fillers, e.g. expandable graphite or aluminum hydroxide or magnesium hydroxide, can also be mixed in. Further possible flame retardants are brominated flame retardants such as octabromo(diphenyl ether), decabromo(diphenyl ether), chlorinated flame retardants such as tetrabromobisphenol A, organophosphorus flame retardants (which may be halogenated), e.g. tris(2-chloroisopropyl) phosphate, tri(1,3-dichloroisopropyl) phosphate, or antimony trioxide.

The components A and B are produced by mixing the components by means of conventional mixing techniques and mixing apparatuses.

The component A generally has a solids content of from 10 to 90% by weight, preferably from 40 to 85% by weight. The component A generally has a paste-like consistency.

Based on the solids content, the two-component system (after mixing of the components A and B) generally comprises the hydraulic binder A-1) and the organic binder V-1) in a weight ratio or from 10:1 to 1:10, preferably from 5:1 to 1:5, in particular from 1:2 to 2:1.

Based on the solids content, the two-component system (after mixing of the components A and B) generally comprises:

from 15 to 50% by weight, preferably from 20 to 40% by weight, of filler V-2).

Based on the solids content, the two-component system generally comprises:

from 0 to 8% by weight, preferably from 1 to 5% by weight, of curing accelerator.

Based on the solids content, the component A generally comprises:

from 0 to 2% by weight, preferably from 0 to 0.5% by weight, of retarder.

To initiate curing, the component A is mixed with the activator component B which comprises the curing activator. The curing activator is, in particular, an alkalizing agent (pH trigger). Possibilities here are, for example, alkali metal and alkaline earth metal hydroxides, oxides and carbonates or Portland cement or mixtures thereof. Preference is given to alkali metal hydroxides such as sodium hydroxide, potassium hydroxide and lithium hydroxide or mixtures thereof.

Particular preference is given to sodium hydroxide or potassium hydroxide or a mixture thereof. The alkalizing agents can also be used in the form of an aqueous solution, e.g. a from 10 to 30% strength solution, or in solid form. Further suitable alkalizing agents are ammonia and amines such as triethanolamine, dimethylethanolamine, methyldiethanolamine and the like.

The curing activator serves to activate curing and drying. It is therefore mixed with the component A only immediately before use. Here, "immediately" means less than 10 minutes before use. The amount of alkalizing agent is selected so that the pH increases to at least 8, preferably to at least 9, but preferably not above 11.5. Higher pH values can require obligatory labeling. The processing time can be regulated within a wide range via the amount of alkalizing agent or the pH resulting therefrom and optionally the amount of the curing accelerator.

The invention also provides a process for forming adhesive bonds or for chemical anchoring, wherein
a) component A and component B of a two-component system according to the invention are mixed,
b) the mixture is introduced into a recess of a substrate or an intermediate space between substrates and
c) an anchoring element or reinforcing element is optionally introduced into the recess or the intermediate space.

The substrate is, for example, concrete, stone, tile, gypsum plaster, gypsum plasterboard, wood, glass, aluminum, polymer or bitumen.

The recess is preferably a hole, hole which does not go through, a join, a crack or a groove.

The process serves, for example, for sealing and/or filling joints, seams, cracks in a substrate or between different substrates, e.g. for forming adhesive joints or grouted cracks.

The anchoring element is, for example, selected from among screws, threaded rods, hooks, iron reinforcement, metal lamellae or the like.

The two-component system of the invention is storage-stable as a result of the activator component B being kept separate from the component A up to the time of use.

For mixing and dispensing, any type of two-component vessel is conceivable which keeps the two components separate up to the time of use and allows homogeneous mixing at the point in time of use. Mention may here be made of, inter alia, containers, drums, buckets, cups, bags, hoses, metal cans, syringes, canulas, tubes, bottles, etc., having two optionally differently sized chambers. The chambers do not necessarily have to be combined in one structural unit; they can also be separate. The containers can be equipped with a suitable mixing unit, e.g. static or dynamic mixers, or separate mixing is effected in one of the two component vessels or entirely outside the component vessels. The vessels consist of a suitable material which meets the requirements in respect of long-lasting impermeability, resistance to chemicals, product safety, handling, transport laws and the like. Sheet metal, polymer or glass is usually employed for this purpose.

The invention also provides an apparatus for mixing and dispensing the two-component system, comprising
  a first chamber comprising the component A,
  a second chamber comprising the component B,
  a mixing chamber which comprises at least one first inlet opening which is connected to the first chamber, at least one second inlet opening which is connected to the second chamber and at least one outlet opening for exit of the material from the mixing chamber and
  an actuator for conveying the first and second components into the mixing chamber.

The two components can, for example, be introduced into commercial two-component cartridges known per se having a mixing-discharge tip. In the case of this packaging method, the provision and use of the two-component system of the invention is particularly simple and reliable.

For filling drilled holes and openings in masonry with injection mortar compositions, manually driven expressing apparatuses or expressing apparatuses driven by a motor are frequently used. The filling of the drilled hole is correctly carried out beginning from the bottom of the drilled hole using the masonry injection mortar which is initially still paste-like but has a high strength after curing. For the drilled hole to be filled uniformly with the mortar composition, the user has to draw back the expressing apparatus uniformly as a function of the progress of filling. In the case of subsequent introduction of, for example, iron reinforcement, the drilled holes have to have a comparatively great depth. To fill these deep drilled holes, the expressing apparatuses are provided with extension tubes or extension hoses so that filling can be effected in the prescribed manner starting from the bottom of the drilled hole. Air inclusions and nonuniform filling in the case of this type of adhesive anchoring of fastening elements in drilled holes are in principle to be avoided since this can have an adverse effect on the holding power of the fastening element subsequently set in.

The two-component system of the invention makes it possible to combine the advantages of reactive masonry injection mortars and conventional paste-like installation adhesive systems. For example, the mechanical properties, especially the pull-out force and curing speed, are achieved and at the same time the unproblematical handling from a health point of view of paste-like, aqueous installation adhesive systems are provided. The hydraulic quick-curing binder system which is activated only on mixing also greatly reduces the otherwise usual shrinkage of aqueous adhesive formulations without losing the tensile bond strength of reactive systems. Thus, the tensile bond strength of a threaded rod (steel 4.8 blank M6 in accordance with DIN 975) bonded by means of the two-component system according to the invention at a penetration depth of 40 mm is $\geq 1$ N/mm$^2$, preferably $\geq 1.5$ N/mm$^2$, after only 24 hours. The value for a commercial reactive system (Hilti HIT-1) is about 3.0 N/mm$^2$.

In addition, the two-component system of the invention displays good complete curing times even at high atmospheric humidity (80-100%) or residual moisture in the drilled hole. It can be produced without great mixing effort since mixing can be effected in situ directly at the use site by means of a suitable packaging method.

The two-component system of the invention cures at a high pH which is able to passivate structural steel. Steel anchors adhesively bonded therewith are also protected against rust in addition to secure anchoring.

The two-component system of the invention is particularly suitable for producing durable fastening of holding elements in a building substrate. Mention may here be made by way of example of adhesive anchoring of fastening elements such as screws, threaded rods, structural steels, expansion anchors, pegs and the like in drilled holes and openings in masonry in the shell of a building (roof, balconies, terraces, cellars, walls, ceilings, floors) and also in infrastructure constructions such as bridges, roads and tunnel constructions.

The following examples illustrate the invention.

Test Methods

The pull-out force was determined by a method based on ISO 6922.

The curing time was determined by observing when the two-component system goes over from the plastic state to the solid state after mixing of the components A and B.

EXAMPLE 1

Masonry injection mortars having the composition indicated in Table 1 were produced; the % by weight indicated are based on the total weight of the two-component system. The following starting materials were used:

| | |
|---|---|
| Suspension of passivated quick-setting cement: | Slurry 2 of US 2014/0343194 having a cement content of about 60%; |
| Polymer 1 (Tg = 24° C.): | Pure acrylate copolymer, solids content 50% by weight; |
| Polymer 2 (Tg = −43° C.): | Pure acrylate copolymer, solids content 70% by weight; |
| Pigment dispersant: | Dispex AA 4030, BASF SE; |
| Emulsifier: | Lutensol AT 18, BASF SE; |
| Inorganic thickener: | Attagel 50; |
| Thickener: | Rheovis PU 1270, BASF SE; |
| Filler: | Silica sand F36 (Mohs hardness 7); Talc (Mohs hardness 1); |
| Accelerator: | Peramin AXL 80, Kerneos, Paris, France; |
| Retarder: | Sodium gluconate, BASF SE. |

The formulations were standardized to the same polymer contents.

TABLE 1

| Starting materials | Experiment 1 | Experiment 2* | Experiment 3* | Experiment 4 | Experiment 5* |
|---|---|---|---|---|---|
| Cement (hardener) | 25 | 0 | 25 | 25 | 25 |
| Polymer 1 (hard) | 36 | 36 | — | — | 36 |
| Polymer 2 (soft) | — | — | — | 26 | — |
| Water | 0 | 25 | 36 | 10 | 0 |
| Lutensol AT 18 (20%) | 0.5 | 0.5 | 0.5 | 0.5 | 0.5 |
| Dispex AA 4030 | 0.3 | 0.3 | 0.3 | 0.3 | 0.3 |
| Sodium gluconate | 0.2 | 0.2 | 0.2 | 0.2 | 0.2 |
| Silica sand F36 | 15 | 15 | 15 | 15 | — |
| Hollow glass spheres | 15 | 15 | 15 | 15 | — |
| Talc | — | — | — | — | 30 |
| Attagel 50 (A) | 1 | 1 | 1 | 1 | 1 |
| Peramin AXL80 | 2 | 2 | 2 | 2 | 2 |
| Rheovis PU 1270 | 0.5 | 0.5 | 0.5 | 0.5 | 0.5 |
| Intermediate total A | 95.5 | 95.5 | 95.5 | 95.5 | 95.5 |
| Water | 0.5 | 0.5 | 0.5 | 0.5 | 0.5 |
| Attagel 50 (B) | 0.5 | 0.5 | 0.5 | 0.5 | 0.5 |
| Peramin AXL80 | 0.5 | 0.5 | 0.5 | 0.5 | 0.5 |
| Sodium hydroxide solution (20% strength) | 3 | 3 | 3 | 3 | 3 |
| Intermediate total B | 4.5 | 4.5 | 4.5 | 4.5 | 4.5 |
| Overall total | 100 | 100 | 100 | 100 | 100 |
| Pull-outforce | 1380 N | 824 N | 324 N | 284 N | 115 N |
| (24 h) specific | 1.50 N/mm$^2$ | 0.90 N/mm$^2$ | 0.35 N/mm$^2$ | 0.31 N/mm$^2$ | 0.12 N/mm$^2$ |
| curing time | 60 min | 12 h | 30 min | 90 min | 20 min |

*Comparative experiment

For comparison, the pull-out force of a market product based on epoxide is 2760 N.

The examples show that the system according to the invention can quickly build up high strengths. Concomitant use of a filler having an insufficient Mohs hardness (experiment 5) leads to a worsened pull-out force. A composition without cement (experiment 2) cures slowly. Concomitant use of an organic binder having a high Tg (Tg above −20° C.; experiment 1 vs. experiment 4) is advantageous for a high pull-out force. The system according to the invention is an aqueous system which is unproblematical from a health point of view.

The invention claimed is:

1. A two-component system for forming adhesive bonds, or for chemical anchoring, comprising a curable binder component A and an activator component B, wherein the component A comprises:
   A-1) an inhibited hydraulic binder selected from the group consisting of calcium aluminate cement, calcium sulfoaluminate cement, and mixtures thereof;
   the component B comprises:
   B-1) a curing activator;
   and at least one of the components A and/or B comprises:
   V-1) an organic binder having a glass transition temperature Tg of −20° C. or above; and
   V-2) a filler having a Mohs hardness of at least 5.

2. The two-component system according to claim 1, wherein the hydraulic binder is inhibited by means of a setting inhibitor selected from the group consisting of boric acid, oxo acids of phosphorus, and salts thereof.

3. The two-component system according to claim 1, wherein the component A additionally comprises:
   A-2) a retarder selected from the group consisting of lignosulfonates; cellulose derivatives, hydroxycarboxylic acids, synthetic retarders, inorganic compounds, and mixtures thereof.

4. The two-component system according to claim 1, wherein at least one of the components A and/or B comprises:
   V-3) a curing accelerator.

5. The two-component system according to claim 4, wherein the curing accelerator is selected from the group consisting of lithium carbonate, lithium sulfate, lithium acetate, lithium silicate, sodium carbonate, sodium sulfate, sodium silicate, sodium aluminate, potassium chloride, potassium silicate, calcium formate, calcium chloride, calcium silicate hydrate, calcium aluminate, aluminum salts, and mixtures thereof.

6. The two-component system according to claim 1, wherein the filler is selected from the group consisting of sand, a-alumina, gravel, ground rock, glass flour, glass spheres, hollow glass spheres, glass fibers, metal fibers, and pyrogenic silicon dioxide.

7. The two-component system according to claim 1, wherein the hardening activator is an alkalizing agent.

8. A process for forming adhesive bonds or for chemical anchoring, wherein
   a) component A and component B of a two-component system according to claim 1 are mixed,
   b) the mixture is introduced into a recess of a substrate or an intermediate space between substrates and
   c) an anchoring element or reinforcing element is optionally introduced into the recess or the intermediate space.

* * * * *